United States Patent
Hamamoto

(10) Patent No.: US 7,333,792 B2
(45) Date of Patent: Feb. 19, 2008

(54) MULTI-CARRIER RECEIVING METHOD AND APPARATUS

(75) Inventor: Katsuaki Hamamoto, Oogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 501 days.

(21) Appl. No.: 11/072,406

(22) Filed: Mar. 7, 2005

(65) Prior Publication Data

US 2005/0215224 A1 Sep. 29, 2005

(30) Foreign Application Priority Data

Mar. 23, 2004 (JP) ............................. 2004-085759

(51) Int. Cl.
- H04B 1/26 (2006.01)
- H04L 27/14 (2006.01)
- H04L 27/16 (2006.01)
- H04L 27/22 (2006.01)

(52) U.S. Cl. ...................... 455/323; 455/139; 455/334; 375/324

(58) Field of Classification Search ................ 455/323, 455/334, 337, 130, 139, 137, 140, 205, 207, 455/210, 260, 313, 319, 336, 108–119, 338; 375/324, 337, 338; 379/324, 322, 260; 370/324
See application file for complete search history.

(56) References Cited

U.S. PATENT DOCUMENTS 6,430,391 B1 *  8/2002  Dent et al. .................. 455/11.1
2004/0114551 A1 *  6/2004  Martin et al. ................ 370/324
2005/0118965 A1 *  6/2005  Tanabe et al. ........... 455/127.1
2005/0152476 A1 *  7/2005  Coersmeier ................. 375/322
2007/0092015 A1 *  4/2007  Hart et al. ................... 375/260

OTHER PUBLICATIONS

Coleri, Sinem., et al. "Channel Estimation Techniques Based on Pilot Arrangement in OFDM Systems." IEEE Transactions on broadcasting, vol. 48, No. 3, Sep. 2002, pp. 223-229.

* cited by examiner

Primary Examiner—Pablo N. Tran
(74) Attorney, Agent, or Firm—McDermott Will & Emery LLP

(57) ABSTRACT

An FFT unit subjects a baseband signal to FFT operation. An IQ-to-phase conversion unit converts an in-phase component value and a quadrature component value of each of a plurality of signals on respective subcarriers subjected to FFT into a phase component value. A phase equalization unit generates a plurality of reference phase values, based on the phase component of each of the plurality of signals on the respective carriers. Further, the phase equalization unit rotates the phase components of the signals on the respective carriers, in accordance with the plurality of reference phase values. A phase correction unit estimates an error in the phase component value of each of the plurality of signals on the respective carriers, based on a phase component of a pilot signal. Further, the phase correction unit rotates the phase component value of each of the plurality of signals on the respective subcarriers for a second time.

25 Claims, 5 Drawing Sheets

MULTI-CARRIER RECEIVING METHOD AND APPARATUS

BACKGROUND OF THE INVENTION

1. Field of the Invention

The present invention relates to a receiving technology and, more particularly, to a receiving method and apparatus receiving a signal in which a plurality of carriers are used.

2. Description of the Related Art

The orthogonal frequency division multiplexing (OFDM) modulation scheme is known as a communication scheme which is robust in a multipath environment, while enabling high-speed data transmission. The OFDM modulation scheme is used in IEEE802.11a, IEEE802.11g and HIPER-LAN/2, which are available as wireless LAN standards. In wireless LAN, a signal is received over a transmission channel environment with time-dependent variation. Frequency-selective fading also affects the signal. Therefore, a receiving apparatus performs dynamic channel estimation. For channel estimation in a receiving apparatus, two types of known signals are provided. One is a known signal provided at the head of a burst signal for the entire set of carriers. This type of signal is referred to as a preamble or a training signal. The other is provided for a selected carrier in the middle of data block of the burst signal. This type of signal is referred to as a pilot signal (See reference (1) in the following Related Art List, for instance).

Related Art List (1) Sinem Coleri, Mustafa Ergen, Anuj Puri, and Ahmad Bahai, "Channel Estimation Techniques Based on Pilot Arrangement in OFDM Systems", IEEE Transactions on broadcasting, 48, No. 3, vol. pp. 223-229, September 2002.

A receiving apparatus subjects a received signal to Fourier transform so as to filter out signals in individual carrier channels (hereinafter, referred to as subcarrier signals). The receiving apparatus further conducts channel estimation adapted for the individual carriers. The receiving apparatus demodulates the received signal by dividing the signal in each of the carrier channels by the transmission channel property estimated for the carrier. A system known as a Ultra Wide Band (UWB) system is being developed as a system delivering a higher data transmission rate than wireless LAN described above. In the UWB system, a data transmission rate ten times higher than that of wireless LAN is delivered. In a situation where the OFDM modulation scheme is applied to the UWB system, multipath effects become more serious as the data transmission rate is increased. In a quadrature modulation scheme such as 16 QAM, this might lead to significant degradation in characteristics due to multipath.

For this reason, the use of QPSK, characterized by the highest transmission quality of the various modulation schemes used in wireless LAN, is suitable. In order to enable a data transmission rate of approximately 10 times higher than wireless LAN using QPSK as a modulation scheme, however, the transmitting apparatus and the receiving apparatus are required of an operation at a higher operating clock than that of wireless LAN. As the operating clock becomes higher, there is an associated increase in power consumption. In particular, the receiving apparatus generally processes a larger number of data bits than the transmitting apparatus and performs more complex processes. Therefore, power consumption in the receiving apparatus is larger. At the same time, for battery-driven operation of the receiving apparatus and the transmitting apparatus, it is preferable that power consumption be small.

SUMMARY OF THE INVENTION

The present invention has been done in view of the above-described circumstances and its object is to provide a receiving method and a receiving apparatus in which power consumption is reduced while degradation in data transmission quality is controlled.

The present invention according to one aspect provides a receiving apparatus. The receiving apparatus comprises: a receiving unit receiving a plurality of signals using respective carriers; a converting unit converting an in-phase component value and a quadrature component value of each of the received plurality of signals into a phase component value; a first phase rotating unit generating a plurality of reference phase values corresponding to the phase component values produced by conversion by the converting unit, based on the phase component values, and rotating the phase component values in accordance with the plurality of reference phase values thus generated; a second phase rotating unit estimating an error in each of the phase component values rotated by the first phase rotating unit with respect to a phase component value of a pilot signal contained in at least selected one of the phase component values rotated by the first phase rotating unit, based on the phase component value of the pilot signal, and rotating, for a second time, each of the phase component values rotated by the first phase rotating unit, based on the estimated error; and a retrieving unit retrieving data from each of the phase component values rotated by the second phase rotating unit for a second time.

With the above-described apparatus, processes including a rotation operation are conducted on the phase components obtained by conversion from the in-phase components and the quadrature components of the plurality of signals. Since the rotation operation is performed by addition and subtraction operations, the processing volume and power consumption are reduced.

The first phase rotating unit may store a plurality of guide phase values corresponding to the phase component values produced by conversion by the converting unit, calculate errors between the phase component values and the plurality of guide phase values stored, and subject selected ones of the errors calculated to a statistical process so as to generate the plurality of reference phase values. The first phase rotating unit may generates the plurality of reference phase values, by calculating moving averages of selected number of errors corresponding to a group of carriers, the group being headed by the lowest-frequency carrier and ending in the highest-frequency carrier. The second phase rotating unit may store phase component values of pilot signals, and estimate an error in each of the phase component values rotated by the first phase rotating unit, when an error between a phase component value of a pilot signal included in at least selected ones of the phase component values rotated by the first phase rotating unit and the phase component value of the stored pilot signal falls within a predetermined range.

The phrase "storing a plurality of guide phase values" refers not only to a case where the plurality of guide phase values themselves are stored, but also to a case where a generator polynomial or rule capable of generating a plurality of guide phase values is stored. The requirement is that a plurality of guide phase values are ultimately output.

The phrase "storing a phase component value of a pilot signal" refers not only to a case where the phase component value of the pilot signal itself is stored, but also to a case where a generator polynomial or rule capable of generating a phase component value of a pilot signal is stored. The requirement is that a phase component value of a pilot signal is ultimately output.

The present invention according to another aspect provides a receiving method. The receiving method comprises the steps of: receiving a plurality of signals using respective carriers; converting an in-phase component value and a quadrature component value of each of the received plurality of signals into a phase component value; generating a plurality of reference phase values corresponding to the phase component values produced by conversion, based on the phase component values, and rotating the phase component values in accordance with the plurality of reference phase values thus generated; estimating an error in each of the phase component values rotated with respect to a phase component value of a pilot signal contained in at least selected one of the phase component values rotated, based on the phase component value of the pilot signal, and rotating, for a second time, each of the phase component values rotated, based on the estimated error; and retrieving data from each of the phase component values rotated for a second time.

Arbitrary combinations of the aforementioned constituting elements, and implementations of the invention in the form of methods, apparatus, systems, recording mediums and computer programs may also be practiced as additional modes of the present invention.

Moreover, this summary of the invention does not necessarily describe all necessary features so that the invention may also be sub-combination of these described features.

DETAILED DESCRIPTION OF THE INVENTION

The invention will now be described based on the following examples which do not intend to limit the scope of the present invention but exemplify the invention. All of the features and the combinations thereof described in the examples are not necessarily essential to the invention.

A summary of the present invention will be given before giving a specific description. An example of the present invention relates to a receiving apparatus used in a ultra wide band (UWB) system to which the OFDM modulation scheme is applied. The transmitting end subjects a multicarrier signal modulated according to the QPSK scheme to inverse Fourier transform for transmission. The transmitted signal forms a burst signal. As in the IEEE802.11a and IEEE802.11g standards, a known preamble is placed at the head of the burst signal, and pilot signals are placed in selected carriers in the middle of data block of the burst signal.

The receiving apparatus according to the example subjects a received signal to Fourier transform so as to filter out signals in individual carrier channels. Each of the plurality of carrier signals thus filtered out includes an in-phase component and a quadrature component. The receiving apparatus converts the in-phase component and the quadrature component of the signal into phase components. Further, the receiving apparatus uses the phase component obtained by signal conversion for channel estimation, equalization according to the result of channel estimation and correction for phase noise. Since these processes are conducted on the phase component of the converted signal, complex multiplication, required in rotating the in-phase component and the quadrature component, is replaced by addition. Consequently, the processing volume is reduced so that power consumption is reduced.

According to the example of the present invention, the following two technologies are provided in order to maintain the quality of received signal when the phase component, instead of the in-phase component and the quadrature component, are processed. According to one technology, the channel characteristic which is used in equalizing a plurality of carrier signals is first determined for each carrier signal. Following this, the channel characteristic is calculated across adjacent carrier signals. Thus, effects from noise are reduced by averaging. For correction for phase noise, pilot signals transmitted using selected carriers are used. According to the second technology, if the phase of an equalized pilot signal differs significantly from the phase of a prestored pilot signal, that pilot signal is not used for phase noise correction. More specifically, such a pilot signal is determined to be less reliable and removed from the process.

Figure 1:
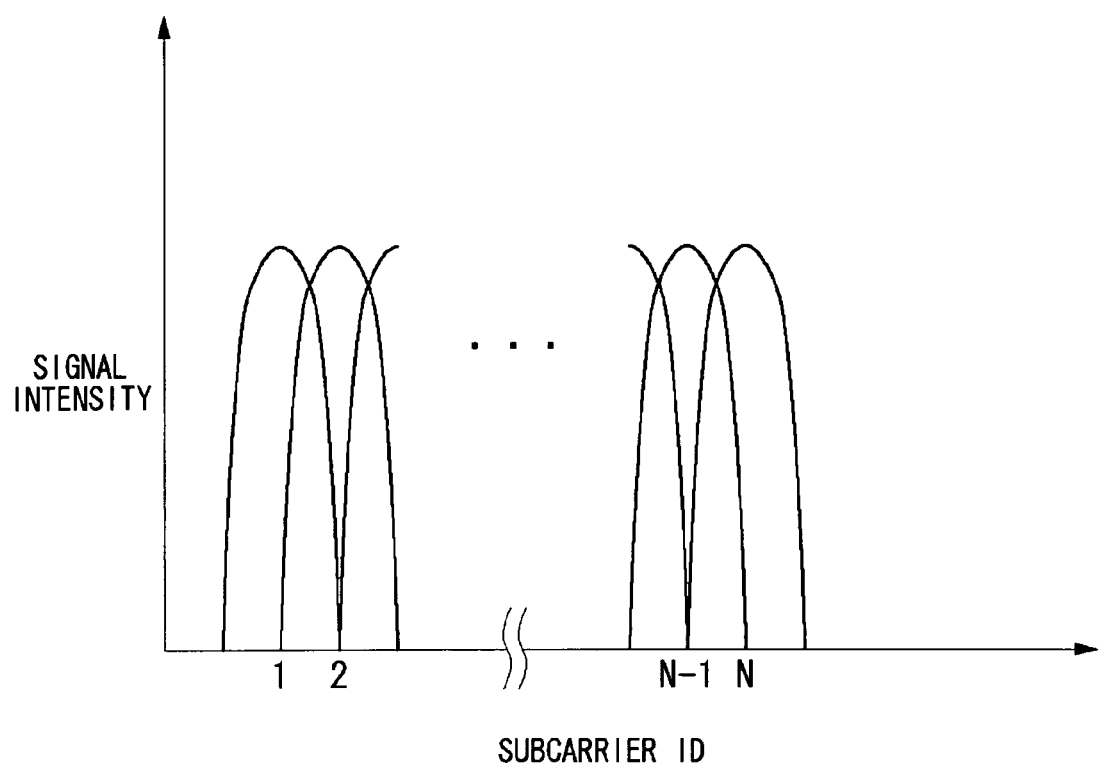
FIG. 1 illustrates the spectrum of a multicarrier signal according to an example of the present invention.

FIG. 1 illustrates the spectrum of a multicarrier signal according to the example. One of a plurality of carriers in the OFDM modulation scheme is usually referred to as a subcarrier. In this example, a single subcarrier is identified by a subcarrier ID. The illustration indicates that there are N subcarriers. The IEEE802.11a standard allocates subcarrier IDs "−26" to "26" to the subcarriers used. An essentially similar numbering, differing only in the notation, is observed in this example. Each of the subcarriers is modulated by the BPSK scheme or the QPSK scheme.

Figure 2:
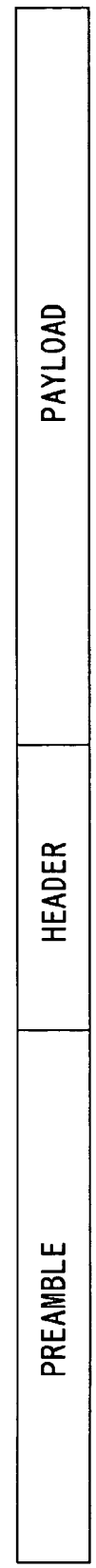
FIG. 2 illustrates the burst format according to the example.

FIG. 2 illustrates the format of a burst according to the example. The burst format is illustrated as encompassing the format according to the IEEE802.11a standard. In the burst signal, a preamble, a signal and a payload are placed in the stated order. A preamble is a known signal transmitted for AGC setting, timing synchronization and carrier recovery in a receiving apparatus. A signal is for control, and a payload is for information to be transmitted from a transmitting apparatus to a receiving apparatus. In the OFDM modulation scheme, a single unit is determined by the Fourier transform size and the number of guard interval symbols. The single unit is referred to as an OFDM symbol. A preamble is formed by a known signal throughout the subcarriers. In a payload, however, only selected symbols in selected subcarrier channels are each formed by a known signal called a pilot signal.

According to the IEEE802.11a and IEE802.11g standards, the Fourier transform size is 64 points and the number of FFT points for the guard interval is 16. Therefore, an OFDM symbols corresponds to 80 FFT points. To further illustrate a contrast with the IEEE802.11a and IEEE802.11g standards, a preamble according to the IEEE802.11a and IEEE802.11g standards contains 40 OFDM symbols, a signal contains 10 OFDM symbols and a data block is of an arbitrary size.

Figure 3:
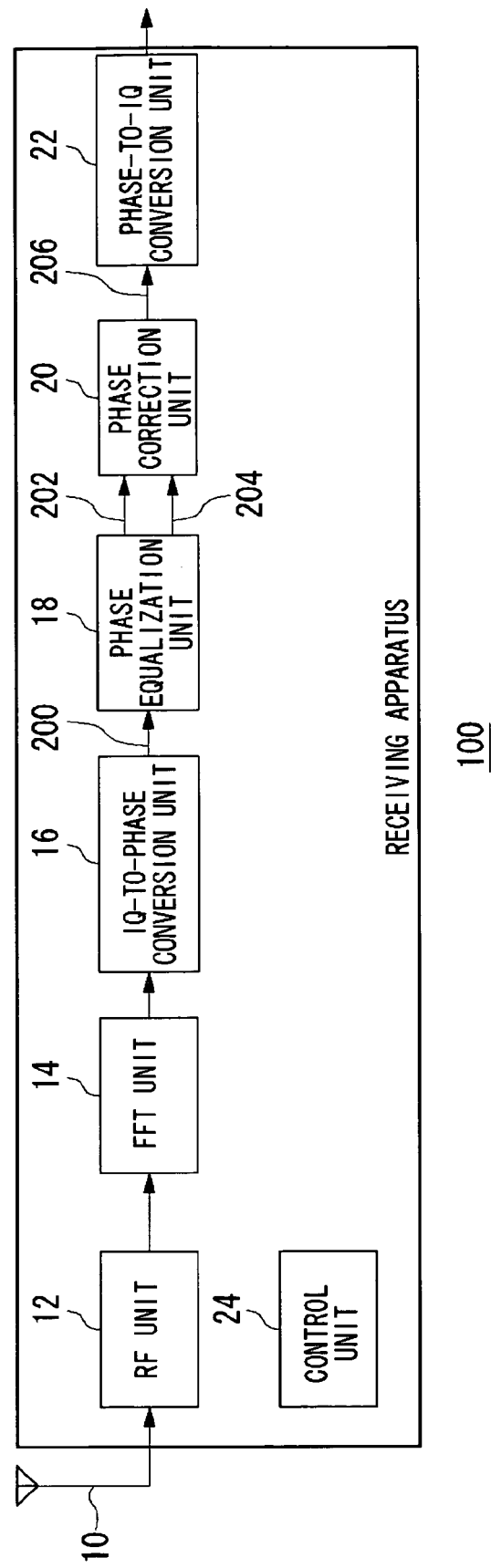
FIG. 3 illustrates the structure of a receiving apparatus according to the example.

FIG. 3 illustrates the structure of a receiving apparatus 100 according to the example. The receiving apparatus 100 comprises an antenna 10, an RF unit 12, a fast Fourier transform (FFT) unit 14, an IQ-to-phase conversion unit 16, a phase equalization unit 18, a phase correction unit 20 and phase-to-IQ conversion unit 22. A converted phase signal 200, a phase equalized signal 202, a decision signal 204 and a phase corrected signal 206 are included in the receiving apparatus 100.

The antenna 10 receives a signal transmitted from a transmitting apparatus (not shown). The received signal has a burst format as shown in FIG. 2 to which the OFDM modulation scheme is applied, i.e., in which a plurality of carriers are used. The RF unit 12 transforms a received radio frequency signal into a baseband signal, and performs processes like amplification, AD conversion, etc.

The FFT unit 14 subjects the baseband signal from the RF unit 12 to FFT transform. More specifically, the FFT unit 14 transforms a time-domain signal into a frequency-domain signal so as to filter out signals in a plurality of subcarrier channels. Each of the signals in the subcarrier channels is a complex signal containing an in-phase component and an quadrature component. As mentioned above, the number of subcarriers in the example is N, requiring that N signal lines be output from the FFT unit 14 of FIG. 3. For simplified illustration, however, only one signal line is shown.

The IQ-to-phase conversion unit 16 converts the in-phase component and the quadrature component of the plurality of subcarrier signals subjected to FFT into a phase component. More specifically, the IQ-to-phase conversion unit 16 converts a two-dimensional signal into a single-dimensional signal not including an amplitude component. To enable this function, the IQ-to-phase conversion unit 16 has a built-in ROM storing arctan data. The IQ-to-phase conversion unit 16 divides the quadrature component by the in-phase component and then converts into the phase component based on the contents of the arctan ROM. The phase component values of the plurality of subcarrier signals are output as converted phase signals 200.

The phase equalization unit 18 generates a plurality of reference phase values corresponding to the phase component values of the plurality of subcarrier signals, based on the phase component values of the plurality of subcarrier signals. Further, the phase equalization unit 18 rotates the phase component values of the plurality of subcarrier signals, based on the plurality of reference phase values thus generated. More specifically, phase distortion for each subcarrier is determined so that the subcarrier signals are corrected for the phase distortion thus determined, since the plurality of subcarrier signals are affected by multipath fading and the phase component values thereof contain subcarrier to subcarrier nonuniform phase distortion. Ideally, each of the signals thus corrected is in one of prescribed phases. Each of the rotated phase component values of the plurality of subcarrier signals is output as a phase equalized signal 202. A value obtained by subjecting the phase equalized signal 202 to hard decision is output as a decision signal 204.

The phase correction unit 20 estimates an error in each of the phase component values of the plurality of subcarrier signals with respect to a phase component of a pilot signal included in at least selected ones of the phase component values of the plurality of subcarrier signals rotated by the phase equalization unit 18, based on the phase component value of the pilot signal. The phase correction unit 20 further rotates the phase component values of the plurality of subcarrier signals for a second time, based on the estimated error. This process is equivalent to estimation of a residual error contained in each of the phase component values of the plurality of subcarrier signals corrected by the phase equalization unit 18, and correction of the phase component accordingly.

More specifically, an error causing the component to be rotated in a predetermined direction is included in each of the phase component values of the plurality of subcarrier signals rotated by the phase equalization unit 18, due, for example, to a sampling frequency error occurring between a transmitting apparatus (not shown) and the receiving apparatus 100 or phase noise from an oscillator (not shown) included in the receiving apparatus 100. The phase correction unit 20 determines the error and conducts uniform phase rotation for the entire set of subcarriers. Each of the phase component values of the plurality of subcarrier signals thus rotated for a second time is output as a phase corrected signal 206.

The IQ-to-phase conversion unit 22 retrieves data from each of the phase component values of the plurality of subcarrier signals rotated for a second time by the phase correction unit 20. More specifically, the phase component values of the plurality of subcarrier signals are re-mapped into the in-phase component and the quadrature component. The control unit 24 controls the timing schedule of the receiving apparatus 100 as a whole. Functions related to timing synchronization, etc. of the receiving apparatus 100 and omitted from illustration in FIG. 3, are controlled by the control unit 24.

The construction as described above may be implemented by hardware including a CPU, a memory and an LSI for an arbitrary computer, and by software including a program provided with reservation and management functions loaded into the memory. FIG. 3 depicts function blocks implemented by cooperation of the hardware and software. Therefore, it will be obvious to those skilled in the art that the function blocks may be implemented by a variety of manners including hardware only, software only or a combination of both.

Figure 4:
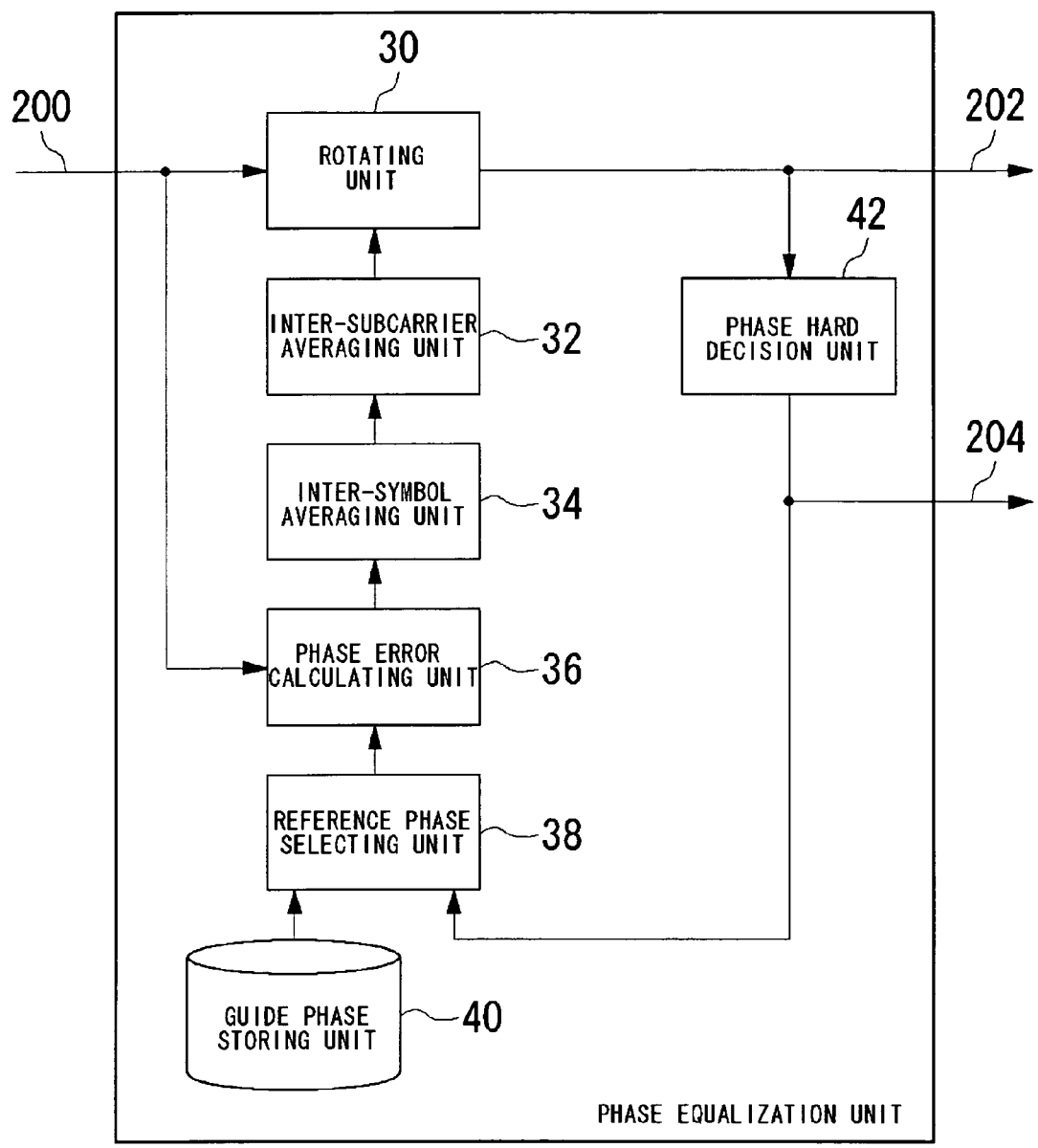
FIG. 4 illustrates the structure of a phase equalization unit of FIG. 3.

FIG. 4 illustrates the structure of the phase equalization unit 18. The phase equalization unit 18 includes a rotating unit 30, an inter-subcarrier averaging unit 32, an inter-symbol averaging unit 34, a phase error calculating unit 36, a reference phase selecting unit 38, a guide phase storing unit 40 and a phase hard decision unit 42. As mentioned before, a total of N signals are processed throughout the illustrated structure, where N indicates the number of subcarriers. For simplified illustration, however, only one of the total of N signal lines is illustrated.

The guide phase storing unit 40 stores a plurality of guide phase values to be referred to in a preamble period, in association with the phase component values of the plurality of subcarrier signals. The guide phases are defined, for example, as "45°", "135°", "−135°" and "−45°", i.e. angles where QPSK constellation points lie. A plurality of guide phases may be generated using a generator polynomial defining the preamble.

The reference phase selecting unit 38 selects the guide phase stored in the guide phase storing unit 40 in a preamble period and selects the signal output from the phase hard decision unit 42 in a header and payload period. Further, the reference phase selecting unit 38 outputs the selected signal to the phase error calculating unit 36. The signal selected by the reference phase selecting unit 38 is also referred to as s guide phase. The phase error calculating unit 36 maps the phase component values of the plurality of subcarrier signals (converted phase signals 200 in the illustration) into the plurality of guide phase values selected by the reference phase selecting unit 38, so as to calculate errors therebetween. More specifically, the phase error calculating unit 36 calculates a phase error for each subcarrier, by subtracting the plurality of guide phase values selected by the reference phase selecting unit 38 from the phase component values of the plurality of subcarrier signals.

The inter-symbol averaging unit 34 averages errors calculated by the phase error calculating unit 36, for each of the subcarriers, i.e. averages errors in a time domain, so as to reduce effects from noise included in the errors. For example, the "j−1"th, "j"th and "j+1"th symbols are averaged in a channel identified by the subcarrier ID of "i", where "j" indicates the ID of a symbol which is larger than 1 and incremented in units of 1.

The inter-subcarrier averaging unit 32 subjects selected ones of the plurality of errors subject to inter-symbol averaging by the inter-symbol averaging unit 34, to a statistical process so as to generate a plurality of reference phase values. The plurality of subcarriers used by respective signals are arranged in the order or frequency. A moving average of the errors for a group of subcarriers (for example, 3 subcarriers), the group being headed by the lowest-frequency subcarrier and ending in the highest-frequency subcarrier, is taken. In this way, a plurality of reference phase values are generated. For example, the reference phase value for the subcarrier with the ID of "2" is determined by averaging the errors for the subcarriers with the IDs "1", "2" and "3". The reference phase value for the subcarrier with the ID of "3" is determined by averaging the errors for the subcarriers with the IDs "2", "3" and "4". The reference phase value for the subcarrier with the ID of "i" is determined by averaging the errors for the subcarriers with the IDs "i−1", "i" and "i+1". That is, an error is reduced by averaging across a plurality of subcarriers.

The rotating unit 30 rotates the phase component values of the plurality of subcarrier signals (the converted phase signals 200 in the illustration) in accordance with the plurality of reference phase values output from the inter-subcarrier averaging unit 32. More specifically, the rotating unit 30 subtracts each of the plurality of reference phase values output from the inter-subcarrier averaging unit 32 from the phase component value of each of the plurality of subcarrier signals. For this purpose, the rotating unit 30 rotates the phase component values of each of the plurality of subcarrier signals in a direction opposite to the direction designated by the error calculated by the phase error calculating unit 36. The result of rotation is output as the phase equalized signal 202.

The phase hard decision unit 42 subjects the phase component value of each of the plurality of subcarrier signals rotated by the rotating unit 30 to hard decision. For example, the phase hard decision unit 42 determines into any of "45°", "135°", "−135°" and "−45°" in the case of QPSK. The result of decision is output as the decision signal 204. Since the phase hard decision unit 42, the reference phase selecting unit 38, the phase error calculating unit 36, the inter-symbol averaging unit 34, the inter-subcarrier averaging unit 32 and the rotating unit 30 constitute a feedback loop, the plurality of reference phases to be generated by the inter-subcarrier averaging unit 32 continue to be updated. A benefit from this is that degradation in receiving characteristics caused, for example, by varying conditions occurring in the radio channel during receiving, is reduced.

Figure 5:
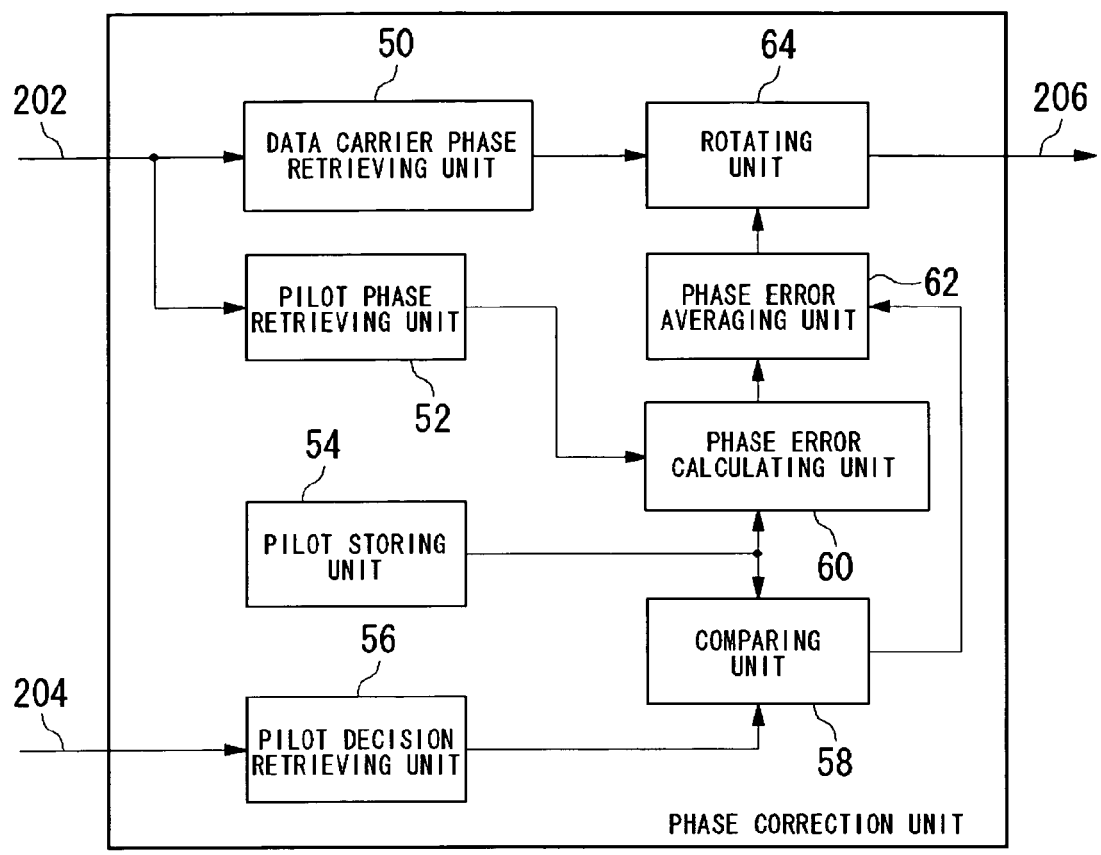
FIG. 5 illustrates the structure of a phase correction unit of FIG. 3.

FIG. 5 illustrates the structure of the phase correction unit 20. The phase correction unit 20 includes a data carrier phase retrieving unit 50, a pilot phase retrieving unit 52, a pilot storing unit 54, a pilot decision retrieving unit 56, a comparing unit 58, a phase error calculating unit 60, a phase error averaging unit 62 and a rotating unit 64. As mentioned before, a total of N signals are processed throughout the illustrated structure, where N indicates the number of subcarriers. For simplified illustration, however, only one of the total of N signal lines is illustrated.

The pilot storing unit 54 stores phase component values of pilot signals included in selected subcarriers in a payload of the burst format illustrated in FIG. 2. The phase component values are defined, for example, as "45°" or "−135°", i.e. angles where BPSK constellation points lie. The pilot signal may be generated by a generator polynomial defining the pilot signal. The pilot phase retrieving unit 52 refers to the input phase equalized signals 202 to retrieve the phase component of a subcarrier corresponding to the pilot signal. Since the subcarrier ID corresponding to the pilot signal is known, the pilot phase retrieving unit 52 retrieves the phase component identified by that subcarrier ID.

The phase error calculating unit 60 calculates, for each pilot signal, an error between the value retrieved by the pilot phase retrieving unit 52 and the value stored in the pilot storing unit 54. More specifically, the phase error calculating unit 60 subtracts, for each pilot signal, the value stored in the pilot storing unit 54 from the value retrieved by the pilot phase retrieving unit 52. The pilot decision retrieving unit 56 retrieves, from the decision signals 204, i.e. from the phases subjected to hard decision by the phase hard decision unit 42 of FIG. 4, the phase identified by the subcarrier ID corresponding to the pilot signal.

The comparing unit 58 compares the phase retrieved by the pilot decision retrieving unit 56 with the phase stored in the pilot storing unit 54. More specifically, the comparing unit 58 determines whether the phase retrieved by the pilot decision retrieving unit 56 matches the phase stored in the pilot storing unit 54. When a result of comparison indicates a match with the phase retrieved by the pilot decision retrieving unit 56, or when a difference between the phase retrieved by the pilot decision retrieving unit 56 and the phase stored in the pilot storing unit 54 falls within a predetermined range, the phase error averaging unit 62 selects the corresponding error calculated by the phase error calculating unit 60. The phase error averaging unit 62 further averages the selected errors so as to estimate a residual error. With such a selection, reliability of the estimated residual error is improved.

The data carrier phase retrieving unit 50 retrieves the phase component values of the subcarrier signals that are not pilot signals, from the input phase equalized signals 202. Since the subcarrier IDs corresponding to the signals that are not pilot signals are known, the phase component values identified by the relevant subcarrier IDs are retrieved. The rotating unit 64 rotates the phase component value of each of the plurality of signals retrieved by the data carrier phase retrieving unit 50 in accordance with the residual error estimated by the phase error averaging unit 62. More specifically, the rotating unit 64 subtracts, for each subcarrier, the residual error estimated by the phase error averaging unit 62 from the phase component value of each of the plurality of signals retrieved by the data carrier phase retrieving unit 50.

A description will now be given of the operation of the receiving apparatus 100 with the structure described above. The antenna 10 and the RF unit 12 receives a burst signal and derives a baseband signal by frequency conversion. The FFT unit 14 subjects the baseband signal derived from frequency conversion to FFT operation so as to convert into a plurality of subcarrier signals. The IQ-to-phase conversion unit 16 transforms the in-phase component value and the quadrature component value of the plurality of subcarrier signals into the phase component value. In a preamble block of the burst format, the phase equalization unit 18 determines a plurality of reference phase values from errors between the plurality of guide phase values stored in the guide phase storing unit 40 and a plurality of phase component values obtained by conversion by the IQ-to-phase conversion unit 16. The phase equalization unit 18 rotates the plurality of phase component values obtained by conversion by the IQ-to-phase conversion unit 16, in accordance with the reference phase values thus determined.

In a header block and a payload in the burst format, the phase equalization unit 18 determines a plurality of reference phase values, based on errors between a plurality of phase values subjected to hard decision by the phase hard decision unit 42 and the plurality of phase component values obtained by conversion by the IQ-to-phase conversion unit 16. The phase equalization unit 18 rotates the plurality of phase component values obtained by conversion by the IQ-to-phase conversion unit 16, in accordance with the reference phase values thus determined. In a header block and a payload in the burst format, the phase correction unit 20 estimates residual errors included in the plurality of phase component values rotated by the phase equalization unit 18, based on the phase of a pilot signal included in a predetermined subcarrier. The phase correction unit 20 rotates, for a second time, the plurality of phase component values rotated by the phase equalization unit 18, in accordance with the estimated residual errors. The phase-to-IQ conversion unit 22 converts the plurality of phase component values rotated by the phase correction unit 20 for a second time into the in-phase component value and the quadrature component value for output.

According to the example of the present invention, the phase components, instead of the in-phase components and the quadrature components, of the signal is processed so that the processing volume is reduced as a result of a complex multiplication operation being replaced by addition and subtraction operations. Since the processing volume is reduced, power consumption is reduced accordingly. Since an average across subcarriers is calculated in determining the reference phase for each of the subcarriers, effects from noise are reduced so that the receiving characteristics are improved. In correcting for effects from phase noise based on the pilot signal, a pilot signal is removed from the process, if the phase of a pilot signal included in the received subcarrier signal differs significantly from the phase of the prescribed pilot signal. Accordingly, the pilot signal less reliable is removed from the process so that the receiving characteristics are improved. Further, power consumption is reduced while preventing degradation in data transmission quality.

Described above is an explanation of the present invention based on the embodiment. The description of the embodiment is illustrative in nature and various variations in constituting elements and processes involved are possible. Those skilled in the art would readily appreciate that the variations are also within the scope of the present invention.

Although the present invention has been described by way of exemplary embodiments, it should be understood that many changes and substitutions may further be made by those skilled in the art without departing from the scope of the present invention which is defined by the appended claims.

What is claimed is:

1. A receiving apparatus comprising:
a receiving unit receiving a plurality of signals using respective carriers;
a converting unit converting an in-phase component value and a quadrature component value of each of said received plurality of signals into a phase component value;
a first phase rotating unit generating a plurality of reference phase values corresponding to said phase component values produced by conversion by said converting unit, based on said phase component values, and rotating said phase component values in accordance with said plurality of reference phase values thus generated;
a second phase rotating unit estimating an error in each of said phase component values rotated by said first phase rotating unit with respect to a phase component value of a pilot signal contained in at least selected one of said phase component values rotated by said first phase rotating unit, based on the phase component value of the pilot signal, and rotating, for a second time, each of said phase component values rotated by said first phase rotating unit, based on the estimated error; and
a retrieving unit retrieving data from each of said phase component values rotated by said second phase rotating unit for a second time.

2. The receiving apparatus according to claim 1, wherein the signals received by said receiving unit are phase modulated.

3. The receiving apparatus according to claim 1, wherein said first phase rotating unit stores a plurality of guide phase values corresponding to said phase component values produced by conversion by said converting unit, calculates errors between said phase component values and said plurality of guide phase values stored, and subjects selected ones of said errors calculated to a statistical process so as to generate said plurality of reference phase values.

4. The receiving apparatus according to claim 2, wherein said first phase rotating unit stores a plurality of guide phase values corresponding to said phase component values produced by conversion by said converting unit, calculates errors between said phase component values and said plurality of guide phase values stored, and subjects selected ones of said errors calculated to a statistical process so as to generate said plurality of reference phase values.

5. The receiving apparatus according to claim 3, wherein the statistical process by said first phase rotating unit is time-domain averaging said errors calculated.

6. The receiving apparatus according to claim 4, wherein the statistical process by said first phase rotating unit is time-domain averaging said errors calculated.

7. The receiving apparatus according to claim 3, wherein said first phase rotating unit generates said plurality of reference phase values, by calculating moving averages of selected number of errors corresponding to a group of carriers, the group being headed by the lowest-frequency carrier and ending in the highest-frequency carrier.

8. The receiving apparatus according to claim 4, wherein said first phase rotating unit generates said plurality of reference phase values, by calculating moving averages of selected number of errors corresponding to a group of carriers, the group being headed by the lowest-frequency carrier and ending in the highest-frequency carrier.

9. The receiving apparatus according to claim 5, wherein said first phase rotating unit generates said plurality of reference phase values, by calculating moving averages of selected number of errors corresponding to a group of carriers, the group being headed by the lowest-frequency carrier and ending in the highest-frequency carrier.

10. The receiving apparatus according to claim 6, wherein said first phase rotating unit generates said plurality of reference phase values, by calculating moving averages of selected number of errors corresponding to a group of carriers, the group being headed by the lowest-frequency carrier and ending in the highest-frequency carrier.

11. The receiving apparatus according to claim 1, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

12. The receiving apparatus according to claim 3, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

13. The receiving apparatus according to claim 4, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

14. The receiving apparatus according to claim 7, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

15. The receiving apparatus according to claim 8, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

16. The receiving apparatus according to claim 9, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

17. The receiving apparatus according to claim 10, wherein said second phase rotating unit stores phase component values of pilot signals, and estimates an error in each of said phase component values rotated by said first phase rotating unit, when an error between a phase component value of a pilot signal included in at least selected ones of said phase component values rotated by said first phase rotating unit and the phase component value of the stored pilot signal falls within a predetermined range.

18. The receiving apparatus according to claim 11, wherein said second phase rotating unit estimates the error in each of said phase component values rotated by said first phase rotating unit, by averaging the errors between the phase component values of the pilot signals and the phase component values of the stored pilot signals.

19. The receiving apparatus according to claim 12, wherein said second phase rotating unit estimates the error in each of said phase component values rotated by said first phase rotating unit, by averaging the errors between the phase component values of the pilot signals and the phase component values of the stored pilot signals.

20. The receiving apparatus according to claim 13, wherein said second phase rotating unit estimates the error in each of said phase component values rotated by said first phase rotating unit, by averaging the errors between the phase component values of the pilot signals and the phase component values of the stored pilot signals.

21. The receiving apparatus according to claim 14, wherein said second phase rotating unit estimates the error in each of said phase component values rotated by said first phase rotating unit, by averaging the errors between the phase component values of the pilot signals and the phase component values of the stored pilot signals.

22. The receiving apparatus according to claim 15, wherein said second phase rotating unit estimates the error in each of said phase component values rotated by said first phase rotating unit, by averaging the errors between the phase component values of the pilot signals and the phase component values of the stored pilot signals.

23. The receiving apparatus according to claim 16, wherein said second phase rotating unit estimates the error in each of said phase component values rotated by said first phase rotating unit, by averaging the errors between the phase component values of the pilot signals and the phase component values of the stored pilot signals.

24. The receiving apparatus according to claim 17, wherein said second phase rotating unit estimates the error in each of said phase component values rotated by said first phase rotating unit, by averaging the errors between the phase component values of the pilot signals and the phase component values of the stored pilot signals.

25. A receiving method comprising the steps of:
receiving a plurality of signals using respective carriers;
converting an in-phase component value and a quadrature component value of each of said received plurality of signals into a phase component value;
generating a plurality of reference phase values corresponding to said phase component values produced by conversion, based on said phase component values, and rotating said phase component values in accordance with said plurality of reference phase values thus generated;
estimating an error in each of said phase component values rotated with respect to a phase component value of a pilot signal contained in at least selected one of said phase component values rotated, based on the phase component value of the pilot signal, and rotating, for a second time, each of said phase component values rotated, based on the estimated error; and
retrieving data from each of said phase component values rotated for a second time.

* * * * *